United States Patent
Chun et al.

(10) Patent No.: US 9,082,557 B2
(45) Date of Patent: Jul. 14, 2015

(54) MULTILAYER CERAMIC CAPACITOR AND METHOD OF MANUFACTURING THE SAME

(71) Applicant: SAMSUNG ELECTRO-MECHANICS CO., LTD., Suwon, Gyunggi-do (KR)

(72) Inventors: Byoung Jin Chun, Gyunggi-do (KR); Byung Jun Jeon, Gyunggi-do (KR); Kyung Pyo Hong, Gyunggi-do (KR); Jae Hwan Han, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 111 days.

(21) Appl. No.: 13/934,959

(22) Filed: Jul. 3, 2013

(65) Prior Publication Data
US 2014/0204502 A1    Jul. 24, 2014

(51) Int. Cl.
*H01G 4/228* (2006.01)
*H01G 9/00* (2006.01)
*H01G 4/30* (2006.01)
*H01G 4/232* (2006.01)
*H01G 4/12* (2006.01)

(52) U.S. Cl.
CPC .................. *H01G 4/30* (2013.01); *H01G 4/232* (2013.01); *H01G 4/2325* (2013.01); *H01G 4/12* (2013.01); *Y10T 29/43* (2013.01)

(58) Field of Classification Search
USPC ...................... 361/306.3, 309, 308.1; 29/25.42
See application file for complete search history.

(56) References Cited

U.S. PATENT DOCUMENTS

| | | |
|---|---|---|
| 2007/0215379 A1 | 9/2007 | Komatsu et al. |
| 2009/0040688 A1 | 2/2009 | Kayatani |
| 2011/0007449 A1 | 1/2011 | Seo et al. |

FOREIGN PATENT DOCUMENTS

| | | |
|---|---|---|
| JP | 10-284343 | 10/1998 |
| JP | 11-162771 | 6/1999 |
| JP | 2003-318059 A | 11/2003 |
| JP | 2007234800 A | 9/2007 |
| JP | 2008166666 A | 7/2008 |
| JP | 2011-018874 A | 1/2011 |
| KR | 2005-0102767 A | 10/2005 |
| KR | 10-0755654 B1 | 9/2007 |
| WO | 2008001542 A1 | 1/2008 |

OTHER PUBLICATIONS

Korean Office Action issued in Korean Application No. 10-2013-0008259 dated Apr. 23, 2014, w/English translation.
Japanese Office Action issued in Japanese Application No. 2013-0134976 dated Feb. 4, 2014.

*Primary Examiner* — Eric Thomas
(74) *Attorney, Agent, or Firm* — McDermott Will & Emery LLP

(57) ABSTRACT

There is provided a multilayer ceramic capacitor including a ceramic body including dielectric layers, first and second internal electrodes formed within the ceramic body and disposed to face each other, having the dielectric layer interposed therebetween, first and second electrode layers disposed on outer surfaces of the ceramic body and electrically connected to the first and second internal electrodes, respectively, a conductive resin layer disposed on the first and second electrode layers and containing copper powder, a nickel plating layer disposed on an outer portion of the conductive resin layer, and a copper-nickel alloy layer disposed between the conductive resin layer and the nickel plating layer and having a thickness of 1 to 10 nm.

14 Claims, 3 Drawing Sheets

MULTILAYER CERAMIC CAPACITOR AND METHOD OF MANUFACTURING THE SAME

CROSS-REFERENCE TO RELATED APPLICATIONS

This application claims the priority of Korean Patent Application No. 10-2013-0008259 filed on Jan. 24, 2013, in the Korean Intellectual Property Office, the disclosure of which is incorporated herein by reference.

BACKGROUND OF THE INVENTION

1. Field of the Invention

The present invention relates to a multilayer ceramic capacitor in which interface separation phenomena between a conductive resin layer included in an external electrode and an electrode layer, and between the conductive resin layer and a plating layer, are decreased, and a method of manufacturing the same.

2. Description of the Related Art

In general, among ceramic electronic components, a multilayer ceramic capacitor includes a plurality of stacked dielectric layers, internal electrodes disposed to face each other, having the dielectric layer interposed therebetween, and external electrodes electrically connected to respective internal electrodes.

Multilayer ceramic capacitors have been widely used as components in computers, mobile communications devices such as personal digital assistants (PDAs), mobile phones, and the like, due to advantages thereof such as relatively small sizes, high degrees of capacitance, ease of mounting, and the like.

Recently, as electronic products have been miniaturized and have had multifunctionalization implemented therein, chip components have also tended to be miniaturized and have multifunctionalization implemented therein. Therefore, a small multilayer ceramic capacitor having a high degree of capacitance has been demanded.

To this end, a multilayer ceramic capacitor in which an increased dielectric layers and internal electrode layers are able to be stacked due to having reduced thicknesses has been manufactured, and external electrodes for use therewith have also been thinned.

In addition, as various functions of devices and apparatuses, such as vehicles or medical devices, used in fields requiring high degrees of reliability are digitalized and demands thereon are increased, high reliability is required in multilayer ceramic capacitors included therein.

As factors causing problems in terms of realizing high degrees of reliability, the infiltration of a plating solution generated at the time of a manufacturing process, crack generation due to external impacts, and the like may be provided as examples.

Therefore, as a means for solving the problem of a lack of reliability, a resin composition containing a conductive material may be applied between an electrode layer of the external electrode and the plating layer to absorb external impacts and prevent infiltration of the plating solution, thereby improving reliability.

However, in the case in which the conductive resin layer is applied between the electrode layer of the external electrode and the plating layer, an interface separation phenomenon may be generated between the conductive resin layer and the plating layer. In particular, this interface separation is frequently generated during a process of mounting the multilayer ceramic capacitor on a substrate, thereby decreasing reliability of the multilayer ceramic capacitor.

In addition, in order to be applied to product groups having a special specification and requiring a high degree of reliability, such as electrical devices, high pressure products, and the like, multilayer ceramic capacitors having a relatively high degree of reliability have been demanded. Therefore, a multilayer ceramic capacitor in which interface separation phenomenon between the conductive resin layer and the plating layer is improved has been demanded.

RELATED ART DOCUMENT

Korean Patent No. 10-0586962

SUMMARY OF THE INVENTION

An aspect of the present invention provides a multilayer ceramic capacitor in which an interface separation phenomenon between a conductive resin layer and an electrode layer and between the conductive resin layer and a plating layer, included in an external electrode, is improved, and a method of manufacturing the same.

According to an aspect of the present invention, there is provided a multilayer ceramic capacitor including: a ceramic body including dielectric layers; first and second internal electrodes formed within the ceramic body and disposed to face each other, having the dielectric layer interposed therebetween; first and second electrode layers disposed on outer surfaces of the ceramic body and electrically connected to the first and second internal electrodes, respectively; a conductive resin layer disposed on the first and second electrode layers and containing copper powder; a nickel plating layer disposed on an outer portion of the conductive resin layer; and a copper-nickel alloy layer disposed between the conductive resin layer and the nickel plating layer and having a thickness of 1 to 10 nm.

The copper-nickel alloy layer may be formed on a region at which the copper powder is exposed to a surface of the conductive resin layer, in a region between the conductive resin layer and the nickel plating layer.

The first and second electrode layers may be fired-type electrodes.

The first and second electrode layers may contain copper (Cu).

The multilayer ceramic capacitor may further include a tin plating layer disposed on the nickel plating layer.

The conductive resin layer may further contain a thermo-setting resin, and the thermo-setting resin may be an epoxy resin.

According to an aspect of the present invention, there is provided a method of manufacturing a multilayer ceramic capacitor, the method including: preparing a plurality of ceramic green sheets; forming internal electrode patterns on individual sheets among the plurality of ceramic green sheets; stacking and firing the plurality of ceramic green sheets to form a ceramic body including dielectric layers and first and second internal electrodes disposed to face each other, having the dielectric layer interposed therebetween; forming first and second electrode layers on end surfaces of the ceramic body to be electrically connected to one ends of the first and second internal electrodes, respectively; applying a conductive resin composition to the electrode layer to form a conductive resin layer containing copper powder; and forming a nickel plating layer on an outer portion of the conductive resin layer and a copper-nickel alloy layer disposed between the conductive resin layer and the nickel plating layer, the copper-nickel alloy layer having a thickness of 1 to 10 nm.

The method of manufacturing a multilayer ceramic capacitor may further include, after the forming of the nickel plating layer and the copper-nickel alloy layer, forming a tin plating layer on the nickel plating layer.

The copper-nickel alloy layer may be formed on a region at which the copper powder is exposed to a surface of the conductive resin layer, in a region between the conductive resin layer and the nickel plating layer.

The first and second electrode layers may be fired-type electrodes.

The first and second electrode layers may contain copper (Cu).

The conductive resin layer may further contain a thermosetting resin, and the thermo-setting resin may be an epoxy resin.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the inventive concept will be described in detail with reference to the accompanying drawings. The invention may, however, be embodied in many different forms and should not be construed as being limited to the embodiments set forth herein.

Rather, these embodiments are provided so that this disclosure will be thorough and complete, and will fully convey the scope of the invention to those skilled in the art.

Hereinafter, embodiments of the present invention will be described in detail with reference to the accompanying drawings.

Figure 1:
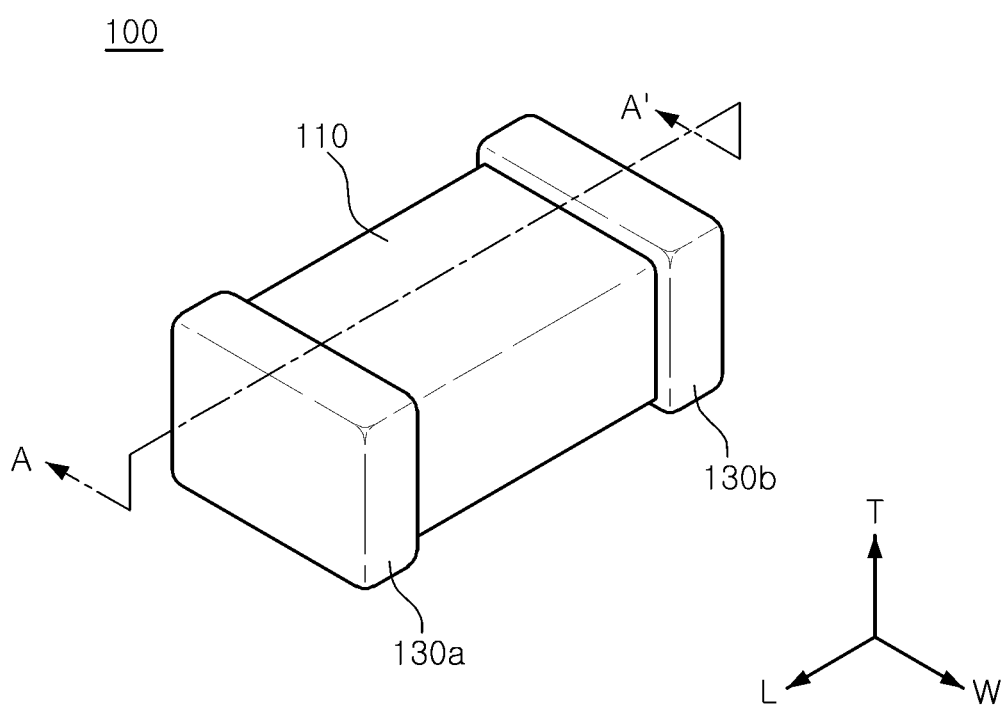
FIG. 1 is a perspective view showing a multilayer ceramic capacitor according to an embodiment of the present invention.
Figure 2:
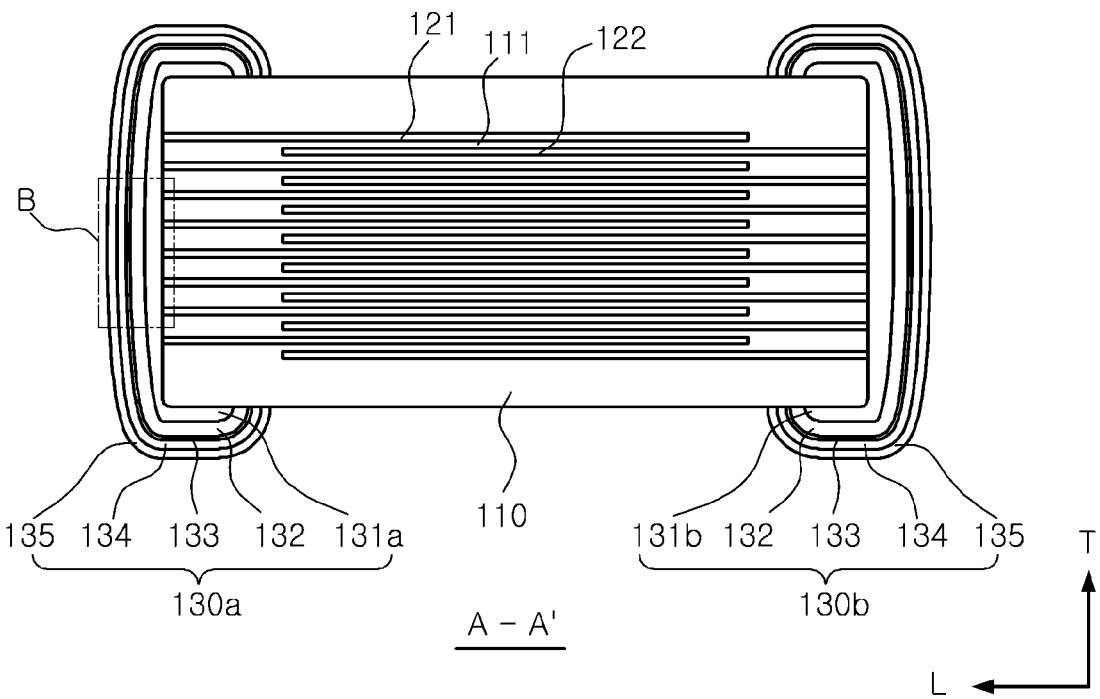
FIG. 2 is a cross-sectional view taken along line A-A' of FIG. 1.

FIG. 1 is a perspective view showing the multilayer ceramic capacitor 100 according to an embodiment of the present invention, while FIG. 2 is a cross-sectional view taken along line A-A' of FIG. 1.

Referring to FIGS. 1 and 2, the multilayer ceramic capacitor 100 according to the embodiment of the present invention may include a ceramic body 110; and first and second external electrodes 130a and 130b.

The ceramic body 110 may include an active layer as a part contributing to the formation of capacitance in the capacitor, and upper and lower cover layers formed on upper and lower portions of the active layer, as upper and lower margin parts. The active layer may include dielectric layers 111 and internal electrodes 121 and 122, wherein a plurality of first and second internal electrodes 121 and 122 may be alternately formed, having the dielectric layer 111 therebetween.

In the embodiment of the present invention, a shape of the ceramic body 110 is not particularly limited, but may be a hexahedral shape. The ceramic body 110 does not have a perfect hexahedral shape but may have a shape substantially close to a hexahedral shape due to firing shrinkage of ceramic powder at the time of firing a chip, a difference in a thickness according to a presence or absence of an internal electrode pattern, and polishing on edge parts of the ceramic body.

Directions of a hexahedron will be defined in order to clearly describe the embodiments of the present invention. L, W and T directions provided in the accompanying drawings refer to a length direction, a width direction, and a thickness direction, respectively. Here, the thickness direction may be the same as a direction in which dielectric layers are stacked.

The internal electrode may be configured of the first and second internal electrodes 121 and 122, wherein the first and second internal electrodes may be disposed to face each other, having the dielectric layer 111 therebetween. The first and second internal electrodes 121 and 122, pairs of electrodes having opposing polarities, may be formed by printing a conductive paste containing a conductive metal on the dielectric layer 111 at a predetermined thickness to be alternately exposed to both end surfaces of the ceramic body, and be electrically insulated from each other by the dielectric layer 111 disposed therebetween.

That is, the first and second internal electrodes 121 and 122 may be electrically connected to the first and second external electrodes 130a and 130b, respectively, through portions alternately exposed to both end surfaces of the ceramic body 110.

Therefore, when voltage is applied to the first and second external electrodes 130a and 130b, electric charges are accumulated between the first and second internal electrodes 121 and 122 facing each other. In this case, the capacitance of the multilayer ceramic capacitor 100 may be in proportion to an area of an overlapped region between the first and second internal electrodes 121 and 122.

A thickness of the first and second internal electrodes 121 and 122 as described above may be determined according to the use thereof. For example, the thickness of the first and second internal electrodes 121 and 122 may be determined to be within a range of 0.2 to 1.0 µm in consideration of the size of the ceramic body 110, but the present invention is not limited thereto.

Further, the conductive metal contained in the first and second internal electrodes 121 and 122 may be nickel (Ni), copper (Cu), palladium (Pd), or an alloy thereof, but the present invention is not limited thereto.

In this case, a thickness of the dielectric layer 111 may be optionally changed according to the capacitance design of the multilayer ceramic capacitor, but a thickness of a single layer may be 0.1 to 10 µm after firing. However, the present invention is not limited thereto.

Further, the dielectric layer 111 may contain a ceramic powder having a high degree of permittivity, for example, a barium titanate ($BaTiO_3$)-based power or a strontium titanate ($SrTiO_3$)-based power, or the like, but the present invention is not limited thereto.

The upper and lower cover layers may have the same material and configuration as those of the dielectric layer 111 except that internal electrodes are not included therein. The upper and lower cover layers may be formed by multi-layering a single or two or more dielectric layers on upper and lower surfaces of the active layer in a vertical direction, respectively, and may generally serve to prevent the first and second internal electrodes 121 and 122 from being damaged by physical or chemical stress.

The first external electrode 130a may be electrically connected to the first internal electrode 121, and the second external electrode 130b may be electrically connected to the second internal electrode 122. The first external electrode 130a may include a first electrode layer 131a, a conductive resin layer 132, a copper-nickel alloy layer 133, and a nickel plating layer 134. The second external electrode 130b may include a second electrode layer 131a, the conductive resin layer 132, the copper-nickel alloy layer 133, and the nickel plating layer 134.

Further, the first and second external electrodes 130a and 130b may further include a tin plating layer 135, wherein the tin plating layer 135 may be formed on the nickel plating layer 134.

The first and second electrode layers 131a and 131b may be directly connected to the first and second internal electrodes to secure electrical conduction between the external electrode and the internal electrode.

The first and second electrode layers 131a and 131b may contain a conductive metal, wherein the conductive metal may be nickel (Ni), copper (Cu), palladium (Pd), gold (Au), or an alloy thereof, but the present invention is not limited thereto.

The first and second electrode layers 131a and 131b may be fired-type electrodes formed by firing of a paste containing the conductive metal.

The conductive resin layer 132 may be disposed on the first and second electrode layers 131a and 131b, and the nickel plating layer 134 may be disposed on an outer portion of the conductive resin layer 132.

In the present specification, a direction in which the ceramic body 110 is present is referred to an inner direction of the conductive resin layer 132, and a direction in which the ceramic body 110 is not present is referred to an outer direction of the conductive resin layer 132.

The nickel plating layer 134 is disposed on the outer portion of the conductive resin layer 132, which may include the case in which another configuration is disposed between the conductive resin layer and the nickel plating layer as well as the case in which the conductive resin layer and the nickel plating layer directly contact each other.

Figure 3:
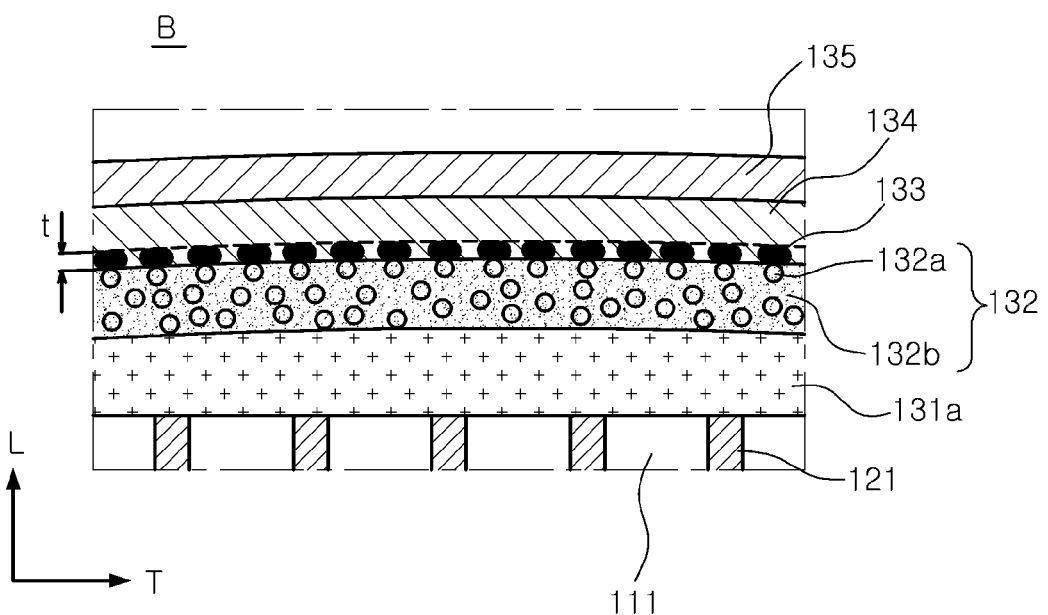
FIG. 3 is an enlarged view of part B of FIG. 2.

FIG. 3 is a view obtained by enlarging part B of FIG. 2 and rotating the part B by 90 degrees in a clockwise direction.

As shown in FIG. 3, the conductive resin layer 132 may contain copper (Cu) powder 132a and a base resin 132b, wherein the base resin may contain a thermo-setting resin. The thermo-setting resin may be an epoxy resin, but is not limited thereto.

As described above, the nickel plating layer 134 is disposed on the outer portion of the conductive resin layer 132. The copper-nickel alloy layer 133 may be formed between the conductive resin layer 132 and the nickel plating layer 134, and particularly, may be formed on a region at which the copper powder 132a contained in the conductive resin layer 132 is exposed to a surface of the conductive resin layer in the region between the conductive resin layer 132 and the nickel plating layer 134. That is, the copper-nickel alloy layer 133 may be formed on the region at which the copper powder contained in the conductive resin layer is exposed to the surface of the conductive resin layer in a direction toward a nickel plating layer, between the conductive resin layer 132 and the nickel plating layer 134.

The nickel plating layer 134 may be disposed on a region at which the copper-nickel alloy layer 133 is not formed on an outer surface of the conductive resin layer 132.

The copper-nickel alloy layer 133 may be formed by a reaction between the copper powder 132a contained in the conductive resin layer 132 according to the embodiment of the present invention and the nickel plating layer 134.

The copper-nickel alloy layer 133 may enhance adhesive force between the conductive resin layer 132 and the nickel plating layer 134, such that the multilayer ceramic capacitor having stability against thermal impact may be provided.

The copper-nickel alloy layer 133 may have a thickness t of 1 to 10 nm. In the case in which the thickness t of the copper-nickel alloy layer 133 is less than 1 nm, the adhesive force between the conductive resin layer 132 and the nickel plating layer 134 is similar to that of a level secured by the thermo-setting resin contained in the conductive resin layer, and additional adhesive force may not be obtained, such that interface separation between the conductive resin layer and the nickel plating layer may be generated.

Further, in the case in which the thickness t of the copper-nickel alloy layer 133 is above 10 nm, stress due to the plating layer may be accumulated on the conductive resin layer by an excessively thick copper-nickel alloy layer, such that interface separation between the conductive resin layer 132 and the first electrode layer 131a or the conductive resin layer 132 and the second electrode layer 131b may be generated.

Therefore, the copper-nickel alloy layer 133 may have a thickness of 1 to 10 nm.

In addition, the first and second electrode layers 131a and 131b may contain copper (Cu). Adhesive force between the first and second electrode layers and the conductive resin layer may be improved by using the same metal as the copper powder contained in the conductive resin layer.

EXPERIMENTAL EXAMPLE

The following Table 1 shows results obtained by evaluating interface adhesive force between an electrode layer and a conductive resin layer (referred to as 'adhesion at inner interface' in Table 1) and interface adhesive force between the conductive resin layer and a nickel plating layer (referred to as 'adhesion at outer interface' in Table 1) according to thicknesses of copper-nickel alloy layers.

Evaluation of the interface adhesive force was performed by a soldering bath test. When the manufactured multilayer ceramic capacitor was immersed in a soldering bath at 300° C. for 10 minutes to apply instant thermal impact thereto, whether or not interface separation occurred was measured. In the following Table 1, the case in which interface separation occurred was represented by "NG" and the case in which interface separation did not occur was represented by "OK"

TABLE 1

| Sample | Thickness of copper-nickel alloy layer (nm) | Adhesion at inner interface | Adhesion at outer interface |
|---|---|---|---|
| 1* | 0.5 | OK | NG |
| 2 | 1 | OK | OK |
| 3 | 3 | OK | OK |
| 4 | 5 | OK | OK |
| 5 | 7 | OK | OK |
| 6 | 10 | OK | OK |
| 7* | 12 | NG | OK |

*Indicates Comparative Example.

As shown in Table 1, in the case in which the thickness of the copper-nickel alloy layer was less than 1 nm, outer interface separation in which the conductive resin layer and the nickel plating layer were separated from each other occurred in the soldering bath test, and in the case in which the thickness of the copper-nickel alloy layer was above 10 nm, inner interface separation that the conductive resin layer and the electrode layer were separated from each other occurred.

Therefore, it may be confirmed by Experimental Example that the thickness of copper-nickel alloy layer may be within the range of 1 to 10 nm, as described above.

According to the embodiment of the present invention, the copper-nickel alloy layer having the suitable thickness is present, such that interface separation between layers included in the external electrode may be prevented. Particularly, the multilayer ceramic capacitor capable of having relatively high resistance against thermal impact generated when the multilayer ceramic capacitor is mounted on a substrate may be provided.

Method of Manufacturing Multilayer Ceramic Capacitor

Figure 4:
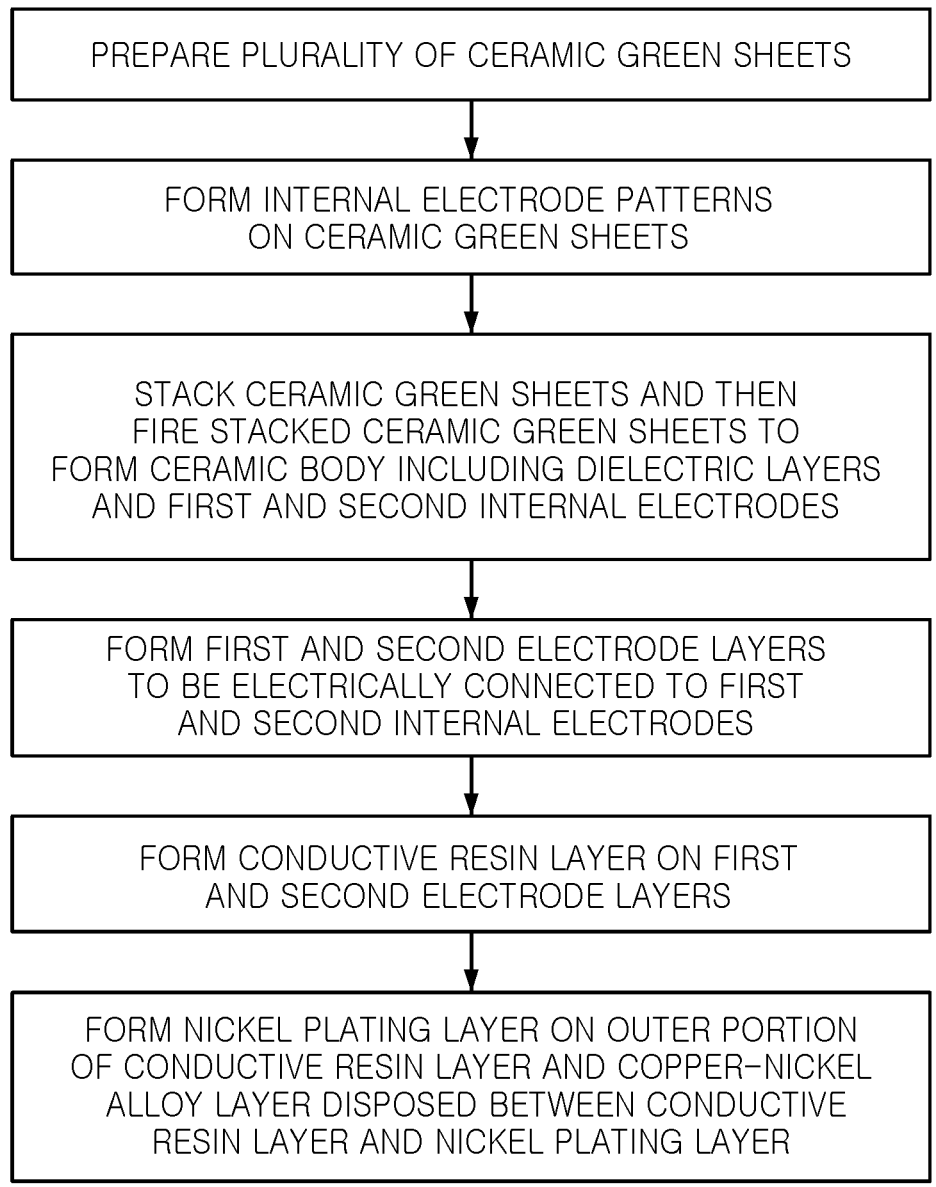
FIG. 4 is a flow chart showing a method of manufacturing a multilayer ceramic capacitor according to another embodiment of the present invention.

FIG. 4 is a manufacturing flow chart showing a method of manufacturing a multilayer ceramic capacitor according to another embodiment of the present invention.

Referring to FIG. 4, the method of manufacturing a multilayer ceramic capacitor according to the embodiment of the present invention may include preparing a plurality of ceramic green sheets; forming internal electrode patterns on individual sheets among the plurality of ceramic green sheets; stacking and firing the plurality of ceramic green sheets to form a ceramic body including dielectric layers and first and second internal electrodes disposed to face each other having the dielectric layer interposed therebetween; forming first and second electrode layers on end surfaces of the ceramic body to be electrically connected to one ends of the first and second internal electrodes, respectively; applying a conductive resin composition to the electrode layer to form a conductive resin layer containing copper powder; and forming a nickel plating layer on an outer portion of the conductive resin layer and a copper-nickel alloy layer disposed between the conductive resin layer and the nickel plating layer, the copper-nickel alloy layer having a thickness of 1 to 10 nm.

Hereinafter, the method of manufacturing a multilayer ceramic capacitor according to the embodiment of the present invention will be described, but the present invention is not limited thereto.

In addition, in descriptions of the method of manufacturing a multilayer ceramic capacitor according to the present embodiment, a description overlapped with that of the above-mentioned multilayer ceramic capacitor will be omitted.

In the method of manufacturing a multilayer ceramic capacitor according to the embodiment of the present invention, first, slurry containing powder such as barium titanate ($BaTiO_3$) powder, or the like, may be applied to a carrier film and dried, to prepare a plurality of ceramic green sheets, thereby forming the dielectric layer and the cover layer.

The ceramic green sheet may be manufactured by mixing the ceramic powder, a binder, and a solvent to prepare the slurry and manufacturing the preparing slurry in a sheet shape having a thickness of several μm by a doctor blade method.

Next, the conductive paste for an internal electrode, containing nickel powder, may be prepared.

After the conductive paste for an internal electrode is applied to the green sheet by a screen printing method to form the internal electrode, a plurality of green sheets on which the internal electrode is printed may be stacked, and a plurality of green sheets on which the internal electrode is not printed may be stacked on upper and lower surfaces of this multilayer body, followed by firing, thereby manufacturing the ceramic body 110. The ceramic body may include the internal electrodes 121 and 122, the dielectric layer 111, and the cover layer, wherein the dielectric layer is formed by firing the green sheet on which the internal electrode is printed, and the cover layer is formed by firing the green sheet on which the internal electrode is not printed.

The internal electrode may be formed as the first and second internal electrodes.

The first and second electrode layers 131a and 131b may be formed on an outer surface of the ceramic body to be electrically connected to the first and second internal electrodes, respectively. The first and second electrode layers may be formed by firing a paste containing a conductive metal and glass.

The conductive metal is not particularly limited, but may be, for example, at least one selected from a group consisting of copper (Cu), silver (Ag), nickel (Ni), and an alloy thereof. As described above, the conductive metal may contain copper (Cu).

The glass is not particularly limited, but may be a material having the same composition as that of glass used to manufacture an external electrode of a general multilayer ceramic capacitor.

The conductive resin composition containing copper may be applied to outer portions of the first and second electrode layers, thereby forming the conductive resin layer 132. The conductive resin composition may contain copper powder and a base resin, wherein the base resin may be an epoxy resin, a thermo-setting resin.

The nickel plating layer 134 may be formed after the conductive resin layer is formed. The nickel plating layer needs to be formed so that the copper-nickel alloy layer 133 has a thickness of 1 to 10 nm between the conductive resin layer and the nickel plating layer. In order to form the copper-nickel alloy layer 133 to a thickness of 1 to 10 nm, process variables such as a concentration of a nickel plating solution, pH, a plating time, and the like, may be adjusted.

The copper-nickel alloy layer 133 may be formed on a region at which the copper powder is exposed to a surface of the conductive resin layer, in a region between the conductive resin layer 132 and the nickel plating layer 134.

Further, the method of manufacturing a multilayer ceramic capacitor may further include forming a tin plating layer 135 on the nickel plating layer.

As set forth above, according to the embodiments of the present invention, the multilayer ceramic capacitor in which an interface separation phenomenon between the conductive resin layer and the electrode layer and between the conductive resin layer and the plating layer, included in the external electrode, is improved, and a method of manufacturing the same, may be provided.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic capacitor comprising:
   a ceramic body including dielectric layers;
   first and second internal electrodes formed within the ceramic body and disposed to face each other, having the dielectric layer interposed therebetween;
   first and second electrode layers disposed on outer surfaces of the ceramic body and electrically connected to the first and second internal electrodes, respectively;
   a conductive resin layer disposed on the first and second electrode layers and containing copper powder;
   a nickel plating layer disposed on an outer portion of the conductive resin layer; and a copper-nickel alloy layer disposed between the conductive resin layer and the nickel plating layer and having a thickness of 1 to 10 nm.

2. The multilayer ceramic capacitor of claim 1, wherein the copper-nickel alloy layer is formed on a region at which the copper powder is exposed to a surface of the conductive resin layer, in a region between the conductive resin layer and the nickel plating layer.

3. The multilayer ceramic capacitor of claim 1, wherein the first and second electrode layers are fired-type electrodes.

4. The multilayer ceramic capacitor of claim 1, wherein the first and second electrode layers contain copper (Cu).

5. The multilayer ceramic capacitor of claim 1, further comprising a tin plating layer disposed on the nickel plating layer.

6. The multilayer ceramic capacitor of claim 1, wherein the conductive resin layer further contains a thermo-setting resin.

7. The multilayer ceramic capacitor of claim 6, wherein the thermo-setting resin is an epoxy resin.

8. A method of manufacturing a multilayer ceramic capacitor, the method comprising:
preparing a plurality of ceramic green sheets;
forming internal electrode patterns on individual sheets among the plurality of ceramic green sheets;
stacking and firing the plurality of ceramic green sheets to form a ceramic body including dielectric layers and first and second internal electrodes disposed to face each other, having the dielectric layer interposed therebetween;
forming first and second electrode layers on end surfaces of the ceramic body to be electrically connected to one ends of the first and second internal electrodes, respectively;
applying a conductive resin composition to the electrode layer to form a conductive resin layer containing copper powder; and
forming a nickel plating layer on an outer portion of the conductive resin layer and a copper-nickel alloy layer disposed between the conductive resin layer and the nickel plating layer, the copper-nickel alloy layer having a thickness of 1 to 10 nm.

9. The method of claim 8, further comprising, after the forming of the nickel plating layer and the copper-nickel alloy layer, forming a tin plating layer on the nickel plating layer.

10. The method of claim 8, wherein the copper-nickel alloy layer is formed on a region at which the copper powder is exposed to a surface of the conductive resin layer, in a region between the conductive resin layer and the nickel plating layer.

11. The method of claim 8, wherein the first and second electrode layers are fired-type electrodes.

12. The method of claim 8, wherein the first and second electrode layers contain copper (Cu).

13. The method of claim 8, wherein the conductive resin layer further contains a thermo-setting resin.

14. The method of claim 13, wherein the thermo-setting resin is an epoxy resin.

* * * * *